United States Patent [19]
Crisp

[11] Patent Number: 5,381,623
[45] Date of Patent: Jan. 17, 1995

[54] FISH LURE

[76] Inventor: James J. Crisp, Rte. 2, Box 89, Mooresburg, Tenn. 37811

[21] Appl. No.: 80,305

[22] Filed: Jun. 24, 1993

[51] Int. Cl.$^6$ ............................................. A01K 85/00
[52] U.S. Cl. ................................. 43/42.43; 43/42.48
[58] Field of Search ............. 43/42.39, 42.43, 42.45, 43/42.47, 42.48, 42.4, 42.41

[56] References Cited

U.S. PATENT DOCUMENTS

| | | | |
|---|---|---|---|
| 1,320,804 | 11/1919 | Squarebriggs | 43/42.47 |
| 1,535,957 | 4/1925 | Stanley | 43/42.48 |
| 2,184,031 | 12/1939 | Wyatt | 43/42.48 |
| 2,450,253 | 9/1948 | Parnell | 43/42.48 |
| 2,467,244 | 4/1949 | Van Hee | 43/42.48 |
| 2,561,515 | 7/1951 | Keller | 43/42.39 |
| 2,714,779 | 8/1955 | Heiner | 43/42.48 |
| 2,756,535 | 7/1956 | Dean | 43/42.48 |
| 4,425,730 | 1/1984 | Goetz | 43/42.43 |
| 4,477,994 | 10/1984 | Erickson | 43/42.48 |
| 4,922,647 | 5/1990 | Tompkins | 43/42.45 |

*Primary Examiner*—P. Austin Bradley
*Assistant Examiner*—James Miner
*Attorney, Agent, or Firm*—Tod R. Nissle

[57] ABSTRACT

A crank lure maintains a horizontal orientation during trolling, is weed free, is self-righting, and increases the likelihood of a strike when the lure is ingested by a fish. The lure connects a fishing line to the top of the head of the lure, generates downward displacement forces at the head and tail of the lure, and generates lateral forces at the tail of the lure. The lateral forces cause the tail to wobble from side to side. The crank lure includes a single hook fixedly attached to the top of the lure.

18 Claims, 2 Drawing Sheets

FISH LURE

This invention relates to fish lures.

More particularly, the invention relates to a crank lure which maintains a horizontal orientation during trolling, which is weed free, which is self-righting, and which increases the likelihood of a strike when the lure is ingested by a fish.

Crank lures are well known in the art. Such lures include a body shaped to simulate a fish, a tail attached to the body to induce a wobble when the lure is pulled through the water, and a plurality of hooked clusters pivotally attached to the bottom of lure. Crank lures are preferred by fishermen because the simulation by the lure of the appearance of a live fish appears to be effective in attracting a live fish to "hit" the lure. One disadvantage of crank lures is that they travel through water in a head-down canted orientation which does not accurately simulate the horizontal orientation of a live fish in water. Another disadvantage of crank lures is that the hook clusters carried by the lures facilitate the entanglement of the lure in weeds subsisting at the bottom of a body of water.

Accordingly, it would be highly desirable to provide an improved crank lure which was weed free, which duplicated the normal horizontal orientation of a live fish in water, which increased the likelihood that a hook on the lure would pierce and engage a fish when ingested by a fish, and which better imitated the side-to-side movement of the body and tail of a live fish.

Therefore, it is a principal object of the invention to provide an improved fish lure.

A further object of the invention is to provide an improved crank lure which maintains a horizontal orientation in the water on a tensioned fish line.

Another object of the invention is to provide an improved crank lure which is weed free and has a greater likelihood of engaging a fish ingesting the lure.

Still a further object of the invention is to provide an improved Crank lure which simulates the wobble of a living fish both when the lure is pulling against a tensioned fishing line and when the lure is free falling through water.

Yet another object of the invention is to provide an improved crank lure which is self-righting.

These and other, further and more specific objects and advantages of the invention will be apparent to those skilled in the art from the following detailed description thereof, taken in conjunction with the drawings, in which.

Briefly, in accordance with my invention, I provide an improved crank lure. The crank lure includes a body member shaped, contoured and dimensioned to simulate the body of a fish, and including a top, a pair of opposed sides, a bottom, a front portion, and a rear portion; a head attached to the front portion of the body member and including a top and a bottom; an eyelet attached to the top of the head for securing a fishing line to the lure; a tail attached to the rear portion and outwardly projecting in a direction away from the eyelet, from the top, and from the bottom and shaped and dimensioned such that when the lure is on a tensioned fishing line, the flow of water over and around the tail causes the lure to wobble from side-to-side; and, at least one hook fixedly attached to the lure.

In another embodiment of my invention, I provide an improved crank lure. The crank lure includes a body member including a top, a pair of opposed sides, a bottom, a front portion, and a rear portion and shaped, contoured and dimensioned to simulate the body of a fish such that water flowing over the body member from the front portion to the rear portion generates lift forces on the body member; a head attached to the front portion of the body member and including a top and a bottom; an eyelet attached to the top of the head for securing a fishing line to the lure; a tail attached to the rear portion and outwardly projecting in a direction away from the eyelet, the top, and the bottom and shaped and dimensioned such that when the lure is on a tensioned fishing line, the flow of water over and around the tail causes the lure to wobble from side to side; and, at least one hook fixedly attached to the lure. The lure is weighted such that when the lure is on a tensioned fishing line and water flows over the lure at one to four miles per hour, the longitudinal axis maintains a horizontal orientation. The head of the lure can include a sloped surface shaped such that the flow of water against the sloped surface generates forces counteracting the lift forces. The hook can be attached to the top of the body member. When the longitudinal axis of the lure is in a horizontal orientation the elevation of the eyelet can be intermediate the highest and lowest elevations of the hook. The lure can be weighted such that when the lure is on a slack line in still water the lure falls downwardly under gravity head first through the water toward the bottom, and, such that when the lure lands on the bottom on one of the opposed sides and a force of a selected magnitude pulls on the head in a direction away from the body, the force causes the body to roll over the bottom to right the body.

Figure 1:
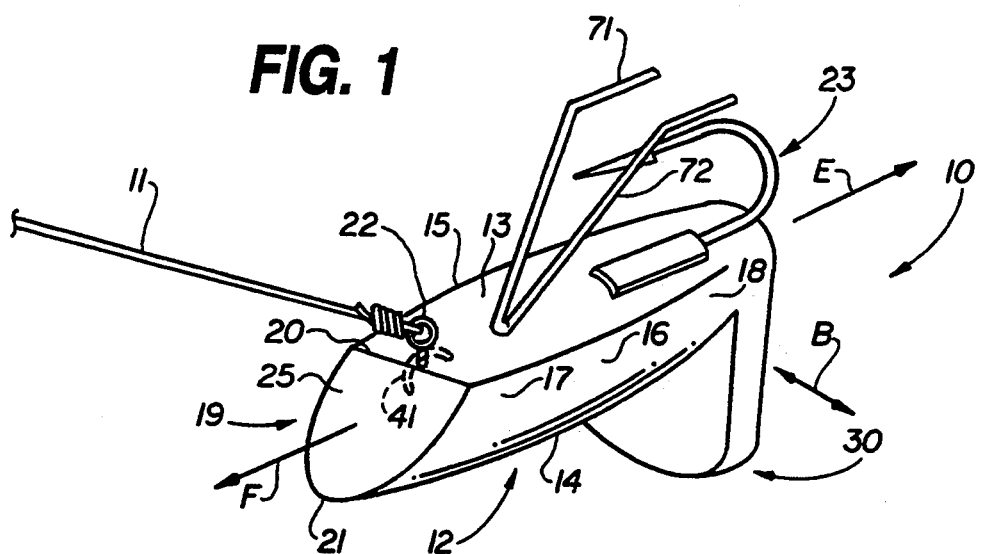
FIG. 1 is a perspective view illustrating a lure constructed in accordance with the principals of the invention.
Figure 3:
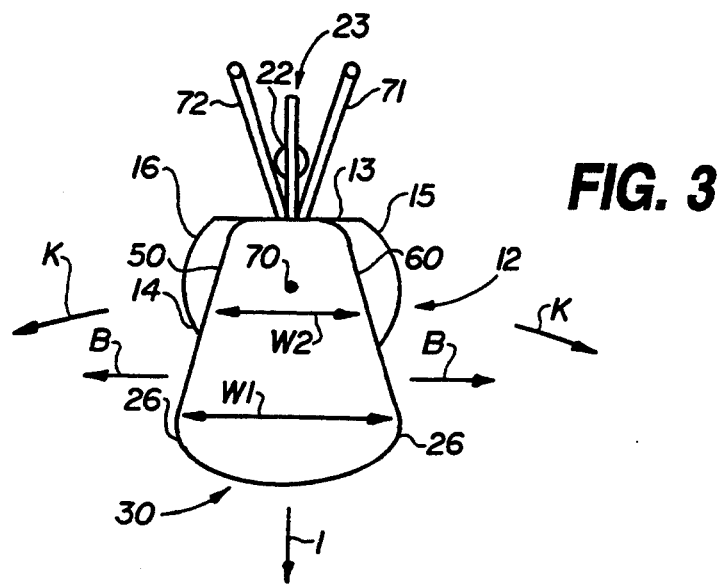
FIG. 3 is an end view illustrating the lure of FIG. 2.

Turning now to the drawings, which depict the presently preferred embodiments of the invention for the purpose of illustrating the practice thereof and not by way of limitation of the scope of the invention and in which like reference characters identify corresponding elements of the several views, FIG. 1 illustrates a crank lure 10 constructed in accordance with the principles of the invention and including a body 12 shaped, contoured and dimensioned to simulate the body of a fish. The body 12 includes a top 13, a bottom 14, a front portion 17, and a rear portion 18. Head 19 is attached to front portion 17 and includes top 20, a bottom 21, and flat surface 25 canted with respect to the longitudinal axis 80 of body 12. Body 12 is shaped to generate lift forces, indicated by arrow H, when water flows over body 12. Eyelet 22 is attached to the top 20 of head 19 for securing fish line 11 to lure 10. Alternatively, an eyelet (41) can be formed, as shown in phantom. Line 11 is secure to lure 10 by tying or otherwise securing line 11 to eyelet 22. Tail 30 is attached to rear portion 18 and outwardly projects in a direction D away from eyelet 22, top 20 and bottom 13. Tail 30 is shaped and dimensioned such that when lure 10 is on a tensioned line 11, the flow of water over and around tail 30 in the direction of arrows C causes the lure 10 to wobble or oscillate from side-to-side in the manner indicated by arrows B in FIGS. 1 and 3. The water flow over lure 10 can be caused by a current flowing over lure 10 in the direction of arrow E and/or by using tensioned line 11 to pull lure 10 in the direction of arrow F through water.

When water moves over lure 10, water wells behind and overflows and moves around tail 30 in the manner indicated by arrows C. After water accumulates and wells up behind the portion of tail 30 with the greatest thickness W1, the water seeks the path of escape of least resistance and flows up, over, and around surfaces 50 and 60 at the portion of tail 30 having a thickness W2 which is less than the thickness W1. The rate of flow or movement of water in the direction of arrows C over surface 50 normally differs from the rate of flow over surface 60. This difference in flow rate causes tail 30, and lure 10, to "wobble" or oscillate from side-to-side in the manner indicated by arrows B.

Water flowing against surface 25 in the direction of arrow G in FIG. 1 produces a force, indicated by arrow I, which acts downwardly and counteracts the lift forces indicated by arrow H. Water flowing over surfaces 50 and 60 in the directions of arrows C also produces forces which act downwardly against surfaces 50 and 60 in the direction of arrow I. The counteracting lift H and downward I forces generated during the movement of the lure 10 through water inter-cooperate to maintain lure 10 in a stable horizontal orientation as it travels through water.

An important feature of lure 10 is the maintaining by lure 10 of an orientation in which the longitudinal axis 30 of the lure is parallel to the horizontal. This is accomplished by positioning eyelet 22 at the top 20 of head 19 at the front of lure 10, by weighting lure 10 so that the center of gravity 70 is the lower central portion of lure 10, and by balancing opposing forces I and H produced by water moving past lure 10.

Figure 2:
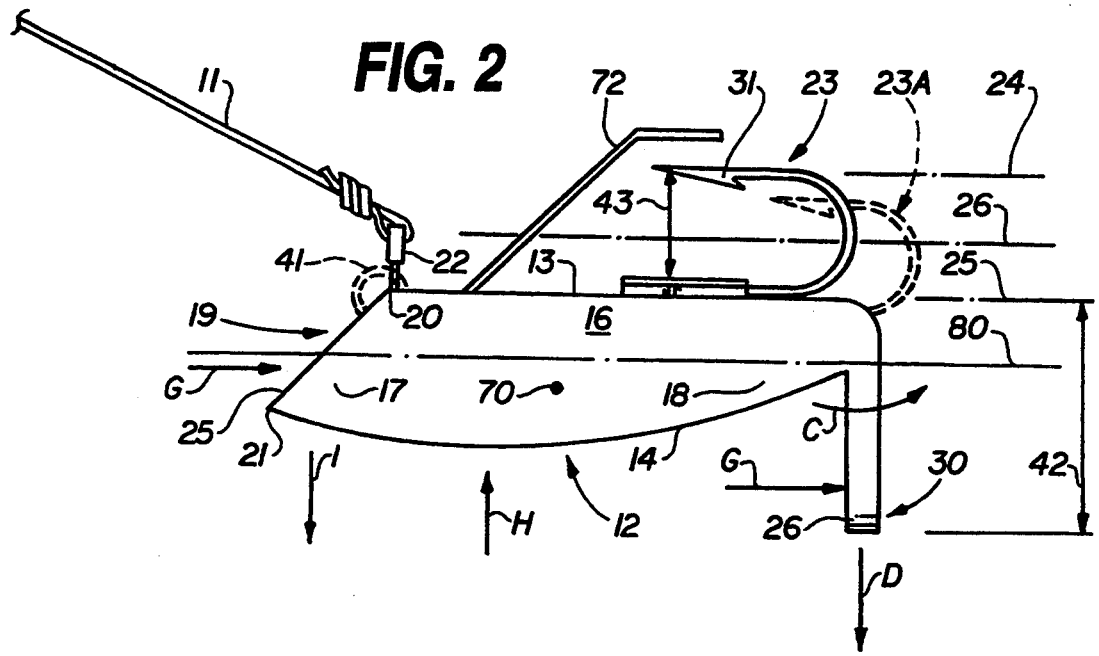
FIG. 2 is a side elevation view illustrating the lure of FIG. 1.

Hook 23 is fixedly attached to the top 13 of lure 10. More than one hook 23 can be fixedly attached to lure 10 at any location on body 12. A single hook is preferred because the single hook configuration is believed to be more likely to pierce and secure a fish than are multiple hook clusters. Legs 71, 72 straddle hook 23 and function to house hook 23 and deflect weeds, drift wood and other materials away from hook 23 to prevent the entanglement of hook 23 in such materials. When lure 10 is in the horizontal orientation of FIGS. 1 to 3, eyelet 22 is at an elevation 26 which bisects and is intermediate the highest 24 and lowest 25 elevations occupied by portions of hook 23. Centering eyelet 22 so that is at an elevation intermediate elevations 24 and 25 of the uppermost and lowermost portions, respectively, of hook 23 facilitates the movement of hook 23 in a direction F parallel to the longitudinal axis 80 of lure 10 when tip 31 is parallel to axis 80.

In use, line 11 is attached to eyelet 22. Lure 10 is pulled through water by tensioned line 11 in the direction of arrow F, typically at a speed of one to four miles per hour. Or, conversely, lure 10 is held by tensioned line 11 in a current of water travelling in the direction of arrow E at a speed of from one to four miles per hour. The movement of water past lure 10 generates counteracting lift H and downward I forces which, along with the weight distribution in the lure 10, with the line 11, and with eyelet 22 maintain lure 10 in a horizontal orientation. The overwelling of water past tail 30 in the direction of arrows C causes tail 30 to wobble or oscillate in the directions indicated by arrows B.

Figure 4:
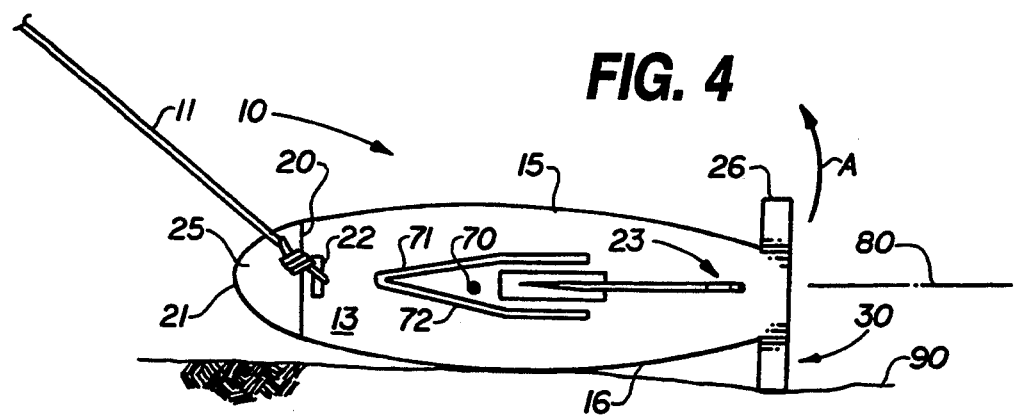
FIG. 4 is a side view illustrating the lure of FIG. 1 at rest immediately after it has settled on the floor of a body of water; and, FIG. 5 is a side view of the lure of FIG. 4 after the lure has righted itself.
Figure 5:
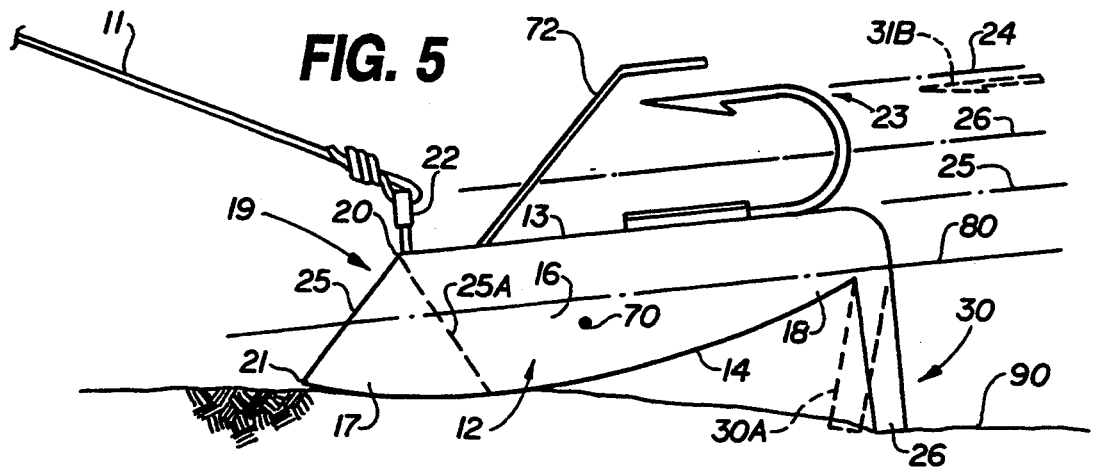

If line 11 goes slack, lure 10 falls head 19 first downwardly through the water toward floor or bottom 90. Lure 10 falls through the water such that longitudinal axis 80 is generally parallel to the vertical. Tail 30 wobbles from side-to-side as lure 10 falls head first through the water. If lure 10 hits bottom 90 and falls on its side to the position shown in FIG. 4, tensioning line 11 causes the lure 10 to roll off of its side 16 and right itself in the orientation shown in FIG. 5. The ability of lure 10 to right itself on bottom 90 is facilitated by positioning eyelet 22 on the top 20 of head 19, by rounding surfaces 26 on tail 30, by having the center of gravity 70 in the lower intermediate portion of body 12, and by the rounding sides 15, 16.

The invention can not be practiced utilizing conventional hook clusters pivotally attached to the bottom of lure 10 or by permitting lure 10 to move through water on a tensioned line 11 in a canted orientation with longitudinal axis 80 at an angle to the horizontal which is greater than about five degrees. Lure 10 maintains itself in a generally horizontal orientation, i.e. within five degrees of horizontal, when the lure 10 moves through the water at speeds in the range of one to five miles per hour.

Having described my invention in such terms as to enable those skilled in the art to understand and practice it, and having described the presently preferred embodiments thereof, I claim:

1. A fish crank lure including
   (a) a body member (12) including a longitudinal axis (80) passing through said body member, a top, a pair of opposed sides, a bottom, a front portion, and a rear portion and shaped, contoured and dimensioned to simulate the body of a fish such that water flowing over said body member from said front portion to said rear portion generates lift forces (H) on said body member;
   (b) a head attached to said front portion of said body member and including a top, a bottom, and a planar surface (25) sloped with respect to said longitudinal axis such that water flowing against said planar surface generates downward forces (I) opposed to said lift forces;
   (c) an eyelet (22) attached to said top of said head for securing a fishing line to said lure;
   (d) a tail
      (i) attached to said rear portion of said body member, normal to the longitudinal axis of said body member, outwardly projecting in a direction away from said eyelet, from said top of said body member, and from said bottom of said body member,
      (ii) including sloped surfaces (50,60), and
      (iii) shaped and dimensioned such that when said lure is on a tensioned fishing line, the flow of water over and around said tail causes said lure to wobble from side-to-side and generates downward forces (I) acting against said surface (50,60) and opposed to said lift forces (H); and,
   (e) at least one hook fixedly attached to said top of said body member.

2. The lure of claim 1 wherein said hook includes a piercing tip (31) positioned directly above said body member when said longitudinal axis is horizontally oriented and with (a) said tip at a greater distance above the ground than said top of said body member, and (b)

said longitudinal axis and said tip (31) lying in a common vertical plane.

3. A fish crank lure including
(a) a body member (12) including a longitudinal axis (80) passing through said body member, a top, a pair of opposed sides, a bottom, a front portion, and a rear portion and shaped, contoured and dimensioned to simulate the body of a fish such that water flowing over said body member from said front portion to said rear portion generates lift forces (H) on said body member;
(b) a head attached to said front portion of said body member and including a top, a bottom, and a planar surface (25) sloped with respect to said longitudinal axis such that water flowing against said planar surface generates downward forces (I) opposed to said lift forces;
(c) an eyelet (22) attached to said head for securing a fishing line to said lure;
(d) a tail attached to said rear portion of said body member;
(e) at least one hook (23) fixedly attached to and outwardly extending from said body and including a piercing tip (31) spaced apart from said body member; and,
(f) a weed guard (71,72) attached to said top of said body member intermediate said hook (23) and said head and intermediate said hook and said eyelet, said weed guard
   (i) protecting said tip from engaging weeds sliding over the weed guard in a direction away from said head and toward said tip,
   (ii) extending from said body member outwardly past, over and laterally to either side of at least a portion of said tip,
   (iii) having a width less than the width of said body member, and
   (iv) being spaced apart from said hook.

4. The lure of claim 3 wherein said tip (31) is positioned directly above said body member when said longitudinal axis is horizontally oriented and with (a) said tip at a greater distance above the ground than said top of said body member, and (b) said longitudinal axis and said tip (31) lying in a common vertical plane.

5. A fish crank lure including
(a) a body member (12) including a longitudinal axis (80) passing through said body member, a top, a pair of opposed sides, a bottom, a front portion, and a rear portion and shaped, contoured and dimensioned to simulate the body of a fish such that water flowing over said body member from said front portion to said rear portion generates lift forces (H) on said body member;
(b) a head attached to said front portion of said body member and including a top, a bottom, and a planar surface (25) sloped with respect to said longitudinal axis such that water flowing against said planar surface generates downward forces (I) opposed to said lift forces, a portion of said planar surface terminating at and forming a juncture with said top (13) of said body member;
(c) an eyelet (22) attached to said lure at said juncture for securing a fishing line to said lure;
(d) a tail (30)
   (i) attached to said rear portion of said body member,
   (ii) normal to the longitudinal axis of said body member,
   (iii) outwardly projecting away from said eyelet, from said top and said bottom of said body member,
   (iv) including a planar surface normal to the longitudinal axis against which water flows when said lure is pulled through the water,
   (v) shaped and dimensioned such that when said lure is on a tensioned fishing line, the flow of water over and around said tail causes said lure to wobble from side-to-side and generates downward forces (I) opposed to said lift forces (H), and
   (vi) extending outwardly from said longitudinal axis (80) in a direction normal to said longitudinal axis a selected distance greater than the distance said bottom (14) extends outwardly from said longitudinal axis; and,
(e) at least one hook fixedly attached to said top of said body member.

6. The lure of claim 5 wherein said hook includes a piercing tip (31) positioned directly above said body member when said longitudinal axis is horizontally oriented and with (a) said tip at a greater distance above the ground than said top of said body member, and (b) said longitudinal axis and said tip (31) lying in a common vertical plane.

7. A self-righting fish crank lure including
(a) a body member (12) including a longitudinal axis (80), a top, a pair of opposed curved convex sides (15,16), a bottom (14), a front portion, and a rear portion and shaped, contoured and dimensioned to simulate the body of a fish such that water flowing over said body member from said front portion to said rear portion generates lift forces (H) on said body member;
(b) a head attached to said front portion of said body member and including a top, a bottom, and a planar surface (25) sloped with respect to said longitudinal axis such that water flowing against said planar surface generates downward forces (I) opposed to said lift forces, a portion of said planar surface terminating at and forming a juncture with said top (13) of said body member;
(c) an eyelet (22) attached to said lure at said juncture for securing a fishing line to said lure;
(d) a tail
   (i) attached to said rear portion of said body member, outwardly projecting in a direction away from said eyelet, from said top of said body member, and from said bottom of said body member, and
   (ii) including a rounded outer edge (26) spaced apart from said body member, and
   (iii) shaped and dimensioned such that when said lure is on a tensioned fishing line, the flow of water over and around said tail causes said lure to wobble from side-to-side and generates downward forces (I) opposed to said lift forces (H); and,
(e) at least one hook fixedly attached to said lure; said body member and said tail shaped and dimensioned such that
   (i) when said lure is laying on its side on a surface underwater, said rounded edge (26) and one of said sides (15,16) contact said surface, and
   (ii) when the fishing line attached to said eyelet (22) is tensioned to pull said eyelet upwardly, said lure rolls on said one of said sides and on said rounded edge (26) to an upright position.

8. The lure of claim 7 wherein said hook includes a piercing tip (31) positioned directly above said body member when said longitudinal axis is horizontally oriented and with (a) said tip at a greater distance above the ground than said top of said body member, and (b) said longitudinal axis and said tip (31) lying in a common vertical plane.

9. A fish crank lure including
 (a) a body member (12) including a longitudinal axis (80), a top, a pair of opposed sides, a bottom, a front portion, and a rear portion and shaped, contoured and dimensioned to simulate the body of a fish such that water flowing over said body member from said front portion to said rear portion generates lift forces (H) on said body member;
 (b) a head attached to said front portion of said body member and including a top, a bottom, and a planar surface (25) sloped with respect to said longitudinal axis such that water flowing against said planar surface generates downward forces (I) opposed to said lift forces;
 (c) an eyelet (22) attached to said head for securing a fishing line to said lure;
 (d) a tail attached to said rear portion of said body member;
 (e) at least one hook (23) fixedly attached to said lure and including a piercing tip (31); and,
 (f) a weed guard attached to said top of said body member intermediate
   (i) said hook (23) and said head, and
   (ii) said hook and said eyelet, said weed guard protecting said tip from engaging weeds sliding over the weed guard in a direction away from said head and toward said tip.

10. The lure of claim 9 wherein said tip is positioned directly above said body member when said longitudinal axis is horizontally oriented and with (a) said tip at a greater distance above the ground than said top of said body member, and (b) said longitudinal axis and said tip (31) lying in a common vertical plane.

11. A fish crank lure including
 (a) a body member (12) including a longitudinal axis (80) passing through said body member, a top, a pair of opposed sides, a bottom, a front portion, and a rear portion and shaped, contoured and dimensioned to simulate the body of a fish such that water flowing over said body member from said front portion to said rear portion generates lift forces (H) on said body member;
 (b) a head attached to said front portion of said body member and including a top, a bottom, and a planar surface (25) sloped with respect to said longitudinal axis such that water flowing against said planar surface generates downward forces (I) opposed to said lift forces;
 (c) an eyelet (22) attached to said top of said head for securing a fishing line to said lure;
 (d) a tail attached to said rear portion of said body member,
 (e) at least one U-shaped hook fixedly attached to said top of said body member, said hook including
   (i) a first end attached to said body member, and
   (ii) a second end with a piercing tip (31) spaced apart from said body member and said first end, the distance of said eyelet (22) from said longitudinal axis (80) being intermediate the distance of said first end from said axis (80) and the distance of said second end from said axis, said eyelet being coplanar with said hook.

12. The lure of claim 11 wherein said hook includes a tip positioned directly above said body member when said longitudinal axis is horizontally oriented and with (a) said tip at a greater distance above the ground than said top of said body member, and (b) said longitudinal axis and said tip (31) lying in a common vertical plane.

13. A fish crank lure including
 (a) a body member (12) including a longitudinal axis (80) passing through said body member, a top, a pair of opposed sides, a bottom, a front portion, and a rear portion and shaped, contoured and dimensioned to simulate the body of a fish such that water flowing over said body member from said front portion to said rear portion generates lift forces (H) on said body member;
 (b) a head attached to said front portion of said body member and including a top, a bottom, and a planar surface (25) sloped with respect to said longitudinal axis such that water flowing against said planar surface generates downward forces (I) opposed to said lift forces;
 (c) an eyelet (22) attached to said top of said head for securing a fishing line to said lure;
 (d) a tail
   (i) attached to said rear portion of said body member, normal to the longitudinal axis of said body member, outwardly projecting in a direction away from said eyelet, from said top of said body member, and from said bottom of said body member,
   (ii) including sloped surfaces (50,60), and
   (iii) shaped and dimensioned such that when said lure is on a tensioned fishing line, the flow of water over and around said tail causes said lure to wobble from side-to-side and generates downward forces (I) acting against said surface (50,60) and opposed to said lift forces (H);
 (e) at least one hook (23) fixedly attached to said body member; and,
 (f) a weed guard attached said body member intermediate
   (i) said hook (23) and said head, and
   (ii) said hook and said eyelet, said weed guard protecting said tip from engaging weeds sliding over the weed guard in a direction away from said head and toward said tip.

14. The lure of claim 13 wherein said hook includes a tip positioned directly above said body member when said longitudinal axis is horizontally oriented and with (a) said tip at a greater distance above the ground than said top of said body member, and (b) said longitudinal axis and said tip (31) lying in a common vertical plane.

15. A self-righting fish crank lure including
 (a) a body member (12) including a longitudinal axis (80), a top, a pair of opposed curved convex sides (15,16), a bottom (14), a front portion, and a rear portion and shaped, contoured and dimensioned to simulate the body of a fish such that water flowing over said body member from said front portion to said rear portion generates lift forces (H) on said body member;
 (b) a head attached to said front portion of said body member and including a top, a bottom, and a planar surface (25) sloped with respect to said longitudinal axis such that water flowing against said planar surface generates downward forces (I) opposed to said lift forces, a portion of said planar surface terminating at and forming a juncture with said top (13) of said body member;

(c) an eyelet (22) attached to said lure at said juncture for securing a fishing line to said lure;

(d) a tail
  (i) attached to said rear portion of said body member, outwardly projecting in a direction away from said eyelet, from said top of said body member, and from said bottom of said body member, and
  (ii) including a rounded outer edge (26) spaced apart from said body member, and
  (iii) shaped and dimensioned such that when said lure is on a tensioned fishing line, the flow of water over and around said tail causes said lure to wobble from side-to-side and generates downward forces (I) opposed to said lift forces (H); and, (e) at least one hook fixedly attached to said lure; and, (f) a weed guard attached said body member intermediate
  (i) said hook (23) and said head, and
  (ii) said hook and said eyelet,
said weed guard protecting said tip from engaging weeds sliding over the weed guard in a direction away from said head and toward said tip;

said body member and said tail shaped and dimensioned such that
  (i) when said lure is laying on its side on a surface underwater, said rounded edge (26) and one of said sides (15,16) contact said surface, and
  (ii) when the fishing line attached to said eyelet (22) is tensioned to pull said eyelet upwardly, said lure rolls on said one of said sides and on said rounded edge (26) to an upright position.

16. The lure of claim 15 wherein said hook includes a piercing tip positioned directly above said body member when said longitudinal axis is horizontally oriented and with (a) said tip at a greater distance above the ground than said top of said body member, and (b) said longitudinal axis and said tip (31) lying in a common vertical plane.

17. A fish crank lure including
(a) a body member (12) including a longitudinal axis (80) passing through said body member, a top, a pair of opposed sides, a bottom, a front portion, and a rear portion and shaped, contoured and dimensioned to simulate the body of a fish such that water flowing over said body member from said front portion to said rear portion generates lift forces (H) on said body member;

(b) a head attached to said front portion of said body member and including a top, a bottom, and a planar surface (25) sloped with respect to said longitudinal axis such that water flowing against said planar surface generates downward forces (I) opposed to said lift forces;

(c) an eyelet (22) attached to said top of said head for securing a fishing line to said lure;

(d) a tail attached to said rear portion of said body member;

(e) at least one U-shaped hook fixedly attached to said top of said body member, said hook including
  (i) a first end attached to said body member, and
  (ii) a second end with a piercing tip (31) spaced apart from said body member and said first end,
the distance of said eyelet (22) from said longitudinal axis (80) being intermediate the distance of said first end from said axis (80) and the distance of said second end from said axis; and, (f) a weed guard attached said body member intermediate
  (i) said hook (23) and said head, and
  (ii) said hook and said eyelet,
said weed guard protecting said tip from engaging weeds sliding over the weed guard in a direction away from said head and toward said tip.

18. The lure of claim 17 wherein said hook includes a piercing tip positioned directly above said body member when said longitudinal axis is horizontally oriented and with (a) said tip at a greater distance above the ground that said top of said body member, and (b) said longitudinal axis and said tip (31) lying in a common vertical plane.

* * * * *